US007691317B2

(12) United States Patent  
Lupke et al.

(10) Patent No.: US 7,691,317 B2
(45) Date of Patent: Apr. 6, 2010

(54) METHOD AND DEVICE FOR MANUFACTURING A DOUBLE-WALLED, THERMOPLASTIC TUBE WITH A CONNECTING SLEEVE

(75) Inventors: Manfred A. A. Lupke, Thornhill (CA); Stefan Lupke, Thornhill (CA)

(73) Assignee: Corma, Inc. (CA)

( * ) Notice: Subject to any disclaimer, the term of this patent is extended or adjusted under 35 U.S.C. 154(b) by 0 days.

(21) Appl. No.: 12/403,074

(22) Filed: Mar. 12, 2009

(65) Prior Publication Data

US 2009/0174123 A1 Jul. 9, 2009

Related U.S. Application Data

(62) Division of application No. 10/239,084, filed as application No. PCT/IB01/01781 on Jul. 25, 2001, now Pat. No. 7,625,196.

(30) Foreign Application Priority Data

Mar. 2, 2001 (DE) ................. 101 10 064

(51) Int. Cl.
  B29C 43/22 (2006.01)
  B29C 59/00 (2006.01)
  B29C 43/00 (2006.01)
  B29D 24/00 (2006.01)
  B29C 45/17 (2006.01)
  B29C 47/92 (2006.01)

(52) U.S. Cl. .............. 264/508; 264/40.3; 264/40.7; 264/500; 264/505; 264/506; 425/378.1; 425/403

(58) Field of Classification Search .............. 264/40.3, 264/40.7, 500, 505, 506, 508; 425/378.1, 425/403
See application file for complete search history.

(56) References Cited

U.S. PATENT DOCUMENTS 3,212,135 A 10/1965 Branscum (Continued)

FOREIGN PATENT DOCUMENTS

EP 0 563 575 A2 10/1993

(Continued)

OTHER PUBLICATIONS

Taschenbuch Maschinenbau, Band 3, VEB-Verlag Technik Berlin, 1987, S. 553.

*Primary Examiner*—Khanh Nguyen
*Assistant Examiner*—Matthew Hoover
(74) *Attorney, Agent, or Firm*—Cahn & Samuels, LLP (57) ABSTRACT

In at least one method for manufacturing a double-walled, thermoplastic tube with a connecting sleeve, which enables precise and complete moulding of the connecting sleeve by simple means, it is provided that a) a first tube (1) is extruded into a mould tunnel (4) comprising at least one row of moulds (5) guided on a path, b) the first tube (1) is given a corrugated shape in at least one first section and expanded into a connecting sleeve in at least one second section, c) a second tube (6) is extruded into the first tube and pressed against the corrugation troughs (8) of the first tube (1), d) while the first tube (1) is being given a corrugated shape and the second tube (6) extruded into the first, the space (A) between the two tubes (1, 6) is subjected to a pressure p1 that is above atmospheric pressure, e) the space (A) between the two tubes (1, 6) is subjected, at a specified time before or after expansion of the first tube (1) into a connecting sleeve, to an essentially constant pressure $p2 \leq p1$ above atmospheric pressure, or to a variable, but not continuously declining pressure p2, f) during extrusion of the second tube (6) into the first tube (1), which has already been expanded into a connecting sleeve, the second tube (6) is internally subjected to a pressure p3 above atmospheric pressure and pressed against the first tube (1), and g) pressure p1 is subsequently again applied to space (A) between the two tubes.

23 Claims, 8 Drawing Sheets

U.S. PATENT DOCUMENTS

| | | |
|---|---|---|
| 4,365,948 A | 12/1982 | Chaplain |
| 4,500,284 A * | 2/1985 | Lupke .................. 425/511 |
| 4,545,751 A | 10/1985 | Lupke |
| 4,555,230 A | 11/1985 | Lupke |
| 4,663,107 A | 5/1987 | Takada et al. |
| 4,741,795 A | 5/1988 | Grace et al. |
| 4,808,098 A | 2/1989 | Chan et al. |
| 4,846,660 A | 7/1989 | Drossbach |
| 4,865,797 A | 9/1989 | Jarvenkyla |
| 4,873,048 A | 10/1989 | Jarvenkyla |
| 5,023,029 A | 6/1991 | Lupke |
| 5,296,188 A | 3/1994 | Lupke |
| 5,320,797 A * | 6/1994 | Hegler et al. ............. 264/511 |
| 5,405,569 A | 4/1995 | Lupke |
| 5,891,383 A | 4/1999 | Joseph |
| 5,992,469 A | 11/1999 | Hegler |
| 6,015,282 A | 1/2000 | Rahn |
| 6,257,866 B1 | 7/2001 | Fritz et al. |
| 6,458,311 B1 | 10/2002 | Hegler |
| 7,214,051 B2 | 5/2007 | Lupke et al. |
| 2004/0232579 A1 | 11/2004 | Lupke et al. |

FOREIGN PATENT DOCUMENTS

| | | |
|---|---|---|
| EP | 0 563 575 A3 | 12/1993 |
| EP | 0 890 770 A2 | 1/1999 |
| EP | 0 995 579 A2 | 9/1999 |
| EP | 0 995 579 A3 | 5/2001 |
| FR | 2 718 509 | 10/1995 |
| JP | 60-79936 | 5/1985 |
| JP | 61148035 A | 7/1986 |
| JP | 61242829 A | 10/1986 |
| JP | 61261020 A | 11/1986 |
| JP | 2000-127220 | 5/2000 |
| WO | WO 85/02144 | 5/1985 |
| WO | WO 95/01251 | 1/1995 |

* cited by examiner

Fig. 8

METHOD AND DEVICE FOR MANUFACTURING A DOUBLE-WALLED, THERMOPLASTIC TUBE WITH A CONNECTING SLEEVE

This patent application is a divisional patent application of U.S. patent application Ser. No. 10/239,084 having a 35 U.S.C. §371(c) date of Jun. 9, 2004, which was the national stage entry of PCT Application No. PCT/IB01/01781 filed on Jul. 25, 2001 and published on Sep. 12, 2002, which claimed the benefit of German Patent Application No. 101 10 064.7 filed on Mar. 2, 2001. All of these patent applications are hereby incorporated by reference.

I. FIELD OF THE INVENTION

The invention relates to a method and a device for manufacturing a double-walled, thermoplastic tube with a connecting sleeve.

II. BACKGROUND OF THE INVENTION

A method of this kind is known from EP 0 563 575 A2, for example. In this method, a first tube is extruded into a mould tunnel comprising at least one row of moulds guided on a path. The first tube is given a corrugated shape in at least one first section and expanded into a connecting sleeve in at least one second section. A second tube is extruded into the first tube and pressed against the corrugation troughs of the first tube, thereby forming a compound tube comprising an outside tube and an inside tube welded to it. While the first tube is being given a corrugated shape and the second tube extruded into the first, the space between the two tubes is subjected to a pressure p1 that is above atmospheric pressure. Pressure p1 is selected such that, after cooling of the tubes that are welded together at the corrugation troughs, the inside tube does not bulge inwards or outwards between these points. After cooling of the tubes, the pressure should return to precisely atmospheric pressure.

The first tube is given a corrugated shape by externally applying a pressure that is below atmospheric pressure. Pressure p1 supports the corrugated shaping of the first tube, but is only relatively slightly above atmospheric pressure as a rule, in order to prevent outward bulging of the inside tube during cooling of the tubes, as described above.

According to EP 0 563 575 A2, the first tube is expanded into a connecting sleeve in the second sections by externally applying a partial vacuum. After expansion of the first tube to form a connecting sleeve, the space between the two tubes is vented to atmospheric pressure.

During extrusion of the second tube into the first tube, which has been expanded into a connecting sleeve, the second tube is internally subjected to pressure p3 above atmospheric pressure and pressed against the first tube. This ensures that full-surface welding of the two tubes is achieved in the region of the connecting sleeve.

After the connecting sleeve has been formed by both tubes and the second tube is again extruded against the corrugation troughs of the first tube in another first section of the same, pressure p1 is again applied to the space between the two tubes.

The external application of a partial vacuum on the first tube for the purpose of forming a connecting sleeve according to EP 0 563 575 A2 is difficult, because the space between the first tube and the associated section of the mould tunnel must be effectively sealed against the ingress of outside air. If sealing of this kind does not exist or is incomplete, the first tube is not expanded precisely in the associated section of the connecting sleeve. The required seal makes it necessary to take complex technical measures.

III. SUMMARY OF THE INVENTION

The object of the invention is to design a method and a device for manufacturing a double-walled, thermoplastic tube with a connecting sleeve, where flawless expansion of the first tube to form a connecting sleeve in the associated section of the mould tunnel is ensured by simple means.

In that the space between the two tubes is subjected, at a specified time before or after expansion of the first tube into a connecting sleeve, to an essentially constant pressure $p2 \leqq p1$ above atmospheric pressure, or to a variable, but not continuously declining pressure p2, the first tube is fully expanded to form a connecting sleeve in the section of the mould tunnel provided for this purpose. The external application of a partial vacuum on the first tube to form the connecting sleeve, which presupposes tight sealing of the space between the first tube and the mould tunnel, is not necessary. Nevertheless, the mould tunnel can have air extraction ducts in the associated sections in which the connecting sleeves are formed. However, they only generate an effective partial vacuum on the outside of the first tube when it is up against the mould tunnel in the entire section of the connecting sleeve.

According to the invention, pressure p2 is set such that the first tube expands precisely into a connecting sleeve in the associated section. If pressure p2 is too low, the first tube will not expand into a connecting sleeve at all, or only insufficiently. On the other hand, if pressure p2 is too high, the first tube is stretched during extrusion such that it has a thinner wall thickness at the beginning of the connecting sleeve and a thicker wall thickness at the end of the connecting sleeve. Excessive pressure can lead to tearing of the first tube during expansion into a connecting sleeve.

Consequently, pressure p2 is preferably set such that the first tube is fully expanded into a connecting sleeve in the second section and displays an essentially constant wall thickness over the entire section.

To this end, it can be expedient for pressure p2 to be held essentially constant during formation of the connecting sleeve. With standard mould tunnel profiles in the section envisaged for the connecting sleeve, and standard wall thicknesses for the first tube, it is expedient for p2 to be less than p1. If the profile height of the sleeve recess in the mould tunnel is small and/or the wall thickness of the first tube large, p2 can be essentially equal to p1. At the end of shaping the first tube in the sleeve recess, it can be expedient for p2 to be greater than p1.

Generally, p2 can be variable, but not continuously declining during extrusion of the two tubes into the sleeve recess of the mould tunnel, in order to ensure that the first tube is fully expanded into a connecting sleeve in the associated section and displays a constant wall thickness.

Pressure p3, which is applied to the second tube during extrusion into the first tube (which has already been expanded into a connecting sleeve) and presses it against the first tube, can be increased in steps so that it initially has a lower value and then a higher value in order to expand the second tube. Pressure p3 can be changed, for example, in two steps, or linearly at least in the initial phase.

The time for switching pressure p1 to pressure p2 is preferably selected such that pressure p2 in the space between the two tubes reaches the target value during expansion of the first tube into a connecting sleeve. If pressure p2 is reached very quickly, pressure p1 is switched to pressure p2 immediately prior to expansion of the first tube into a connecting sleeve. If pressure p2 is only reached after a certain time, the pressure is switched prior to the expansion of the first tube in accordance with this time.

The switching of pressure p1 to pressure p2 at the specified time is preferably a function of the position of the moulds provided with the sleeve recess, relative to the direction in which the first tube is extruded into the corrugated or connecting-sleeve shape.

In order for the second tube to be effectively welded to the first tube, a pressure p3 is applied to the inside of the second tube at a predetermined time prior to the extrusion of the second tube into the first tube, which has already been expanded into a connecting sleeve.

This time can be determined by a specified position of the moulds provided with the sleeve recess, relative to the direction of extrusion.

In order to control pressures p1, p2 and p3, it can be provided that the assumption of a specified position of a mould on its path is detected and the setting of pressures p1, p2 and p3 is controlled with the help of this detected information. Furthermore, events that make it possible to determine the distance travelled by the moulds on the path can be detected and pressures p1, p2 and p3 set with the help of this detected information.

The compressed gas controller connected to the first gas duct can be equipped with a pressure controller that can control the pressure of the gas flowing into the space between the two tubes.

Instead of open-loop or closed-loop control of the pressure of the gas flowing into the space between the two tubes, the compressed gas controller can have a flowmeter that provides open-loop or closed-loop control of the gas volume flowing into the space between the two tubes.

For the open-loop or closed-loop control of the pressure or gas volume, a pressure measuring device can be provided to measure the pressure prevailing in the space between the two tubes.

For precise adjustment of pressures p1 and p2 in the space between the two tubes, sensors can be provided to measure the temperature of the gas in the space between the two tubes and/or that of the thermoplastic material of the tubes. The compressed gas controller is preferably designed such that the gas pressure or gas volume required to reach pressures p1 and p2 can be set on the basis of the temperature values.

In another configuration of the compressed gas controller according to the invention for the two gas ducts, a specified pressure differential between p1 and p2 can be set and preferably controlled.

In order to activate the compressed gas controllers, a mark can be made on the outside of a mould and a stationary sensor provided, with which the mark can be detected at a specific position of the mould on its path. In this case, the controller is equipped with a program that activates the compressed gas controllers based on the detection of the mark by the sensor.

In particular, the mark can consist of a projection or recess on the outside of the mould, and the sensor can be a proximity switch.

In order to activate the compressed gas controllers, a pulse generator can be provided that generates pulses whose time difference is a function of the distance travelled by the moulds on their path during this time difference. The pulses are detected by the controller, which has a program that activates the compressed gas controllers based on the pulses.

Furthermore, the controller can be designed to permit variable setting of the flow rate of thermoplastic material respectively extruded through the two dies of the extruder, and/or the speed of the moulds on their path.

IV. BRIEF DESCRIPTION OF THE DRAWINGS

Practical examples of the invention are described below on the basis of the drawing. The drawing show the following.

V. DETAILED DESCRIPTION OF THE DRAWINGS

FIGS. 1 to 6 show the essential consecutive process steps involved in the manufacture of a double-walled, thermoplastic tube with connecting sleeve.

Figure 1:
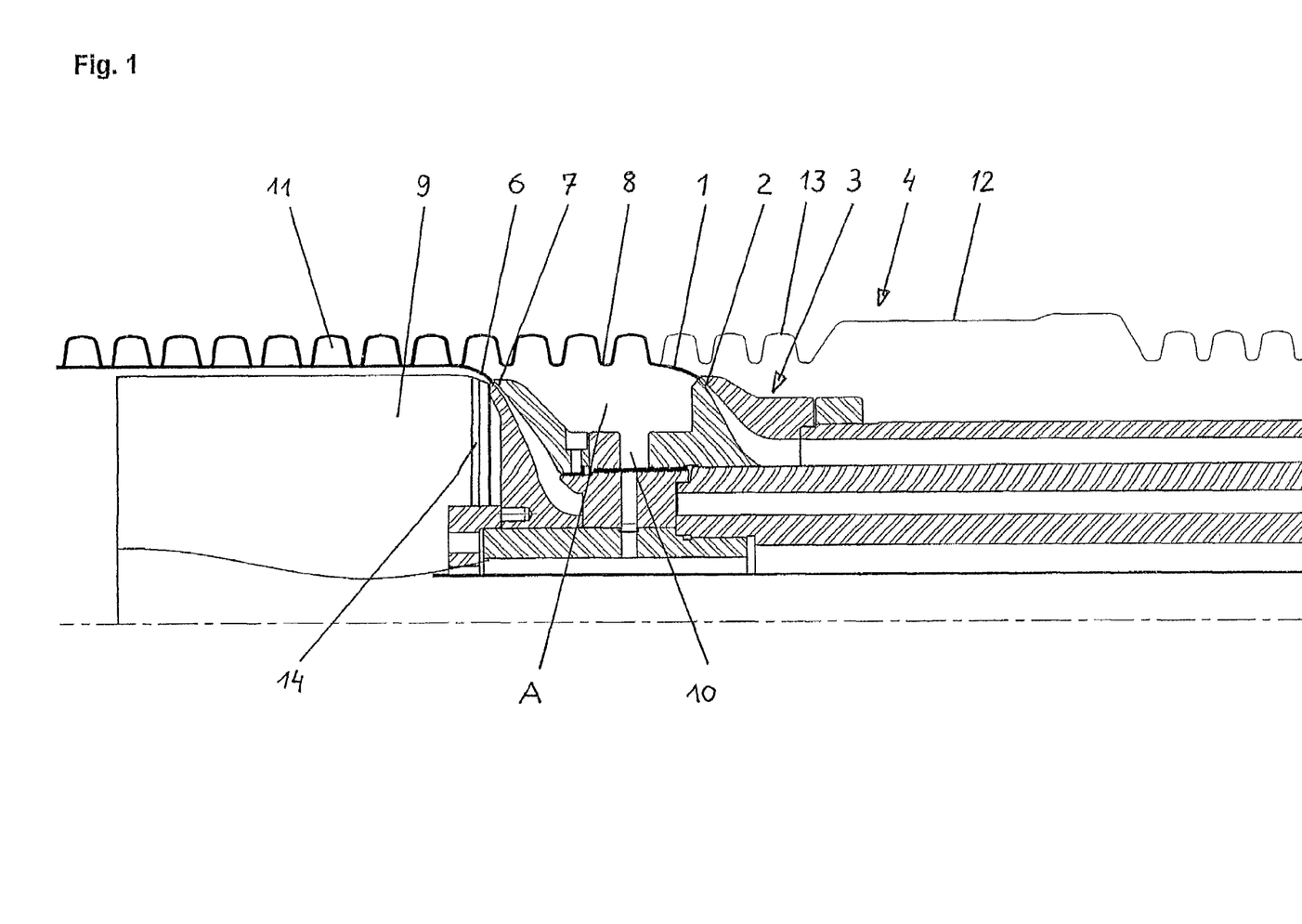
FIG. 1 is a longitudinal section through part of an extrusion head and a mould tunnel prior to manufacture of a connecting sleeve.

In the step shown in FIG. 1, a first tube 1 is extruded through a first die 2 in an extrusion head 3 into a mould tunnel 4 and given a corrugated shape in a first section.

Figure 7:
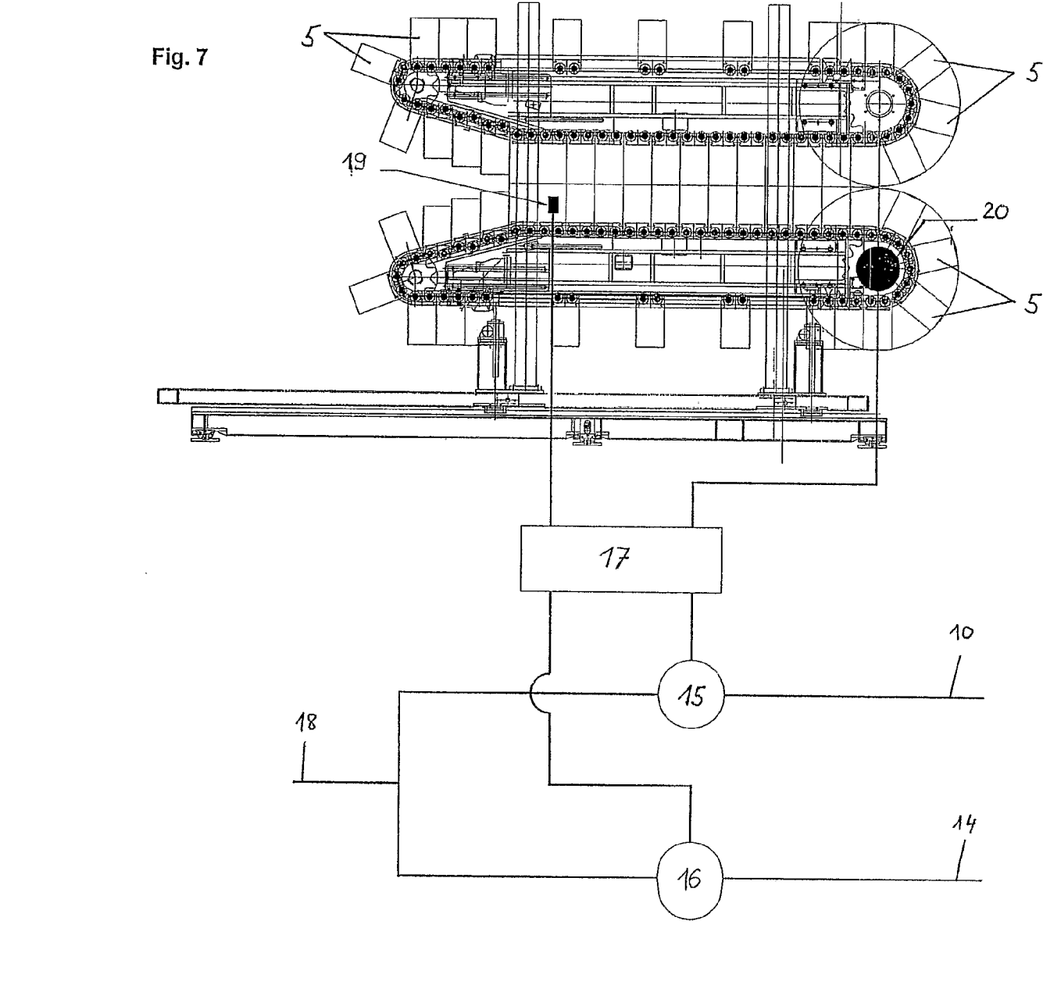
FIG. 7 is a schematic diagram of the open-loop control of pressures p1, p2 and p3.

As shown in FIG. 7, mould tunnel 4 comprises two rows of circulating half-moulds 5.

FIG. 1 further shows that a second tube 6 is extruded through a second die 7 of extrusion head 3 into the first tube and pressed against corrugation troughs 8 of first tube 1. Downstream of extrusion head 3 in the direction of production is a calibrating mandrel 9 for second tube 6, which can be equipped with a cooling device (not shown).

While first tube 1 is being given a corrugated shape and second tube 6 pressed against corrugation troughs 8 of first tube 1 and welded to them, space A between the two tubes 1 and 6 is subjected to pressure p1, which is above atmospheric pressure. The pressure is generated by compressed gas flowing out of a first gas duct 10 located between the two dies 2 and 7 on extrusion head 3.

Pressure p1 is set such that, after cooling of the two tubes 1 and 6, intermediate spaces 11 between the two tubes return to atmospheric pressure to ensure that the second tube does not display any bulges at the points of connection to corrugation troughs 8 of first tube 1.

Figure 2:
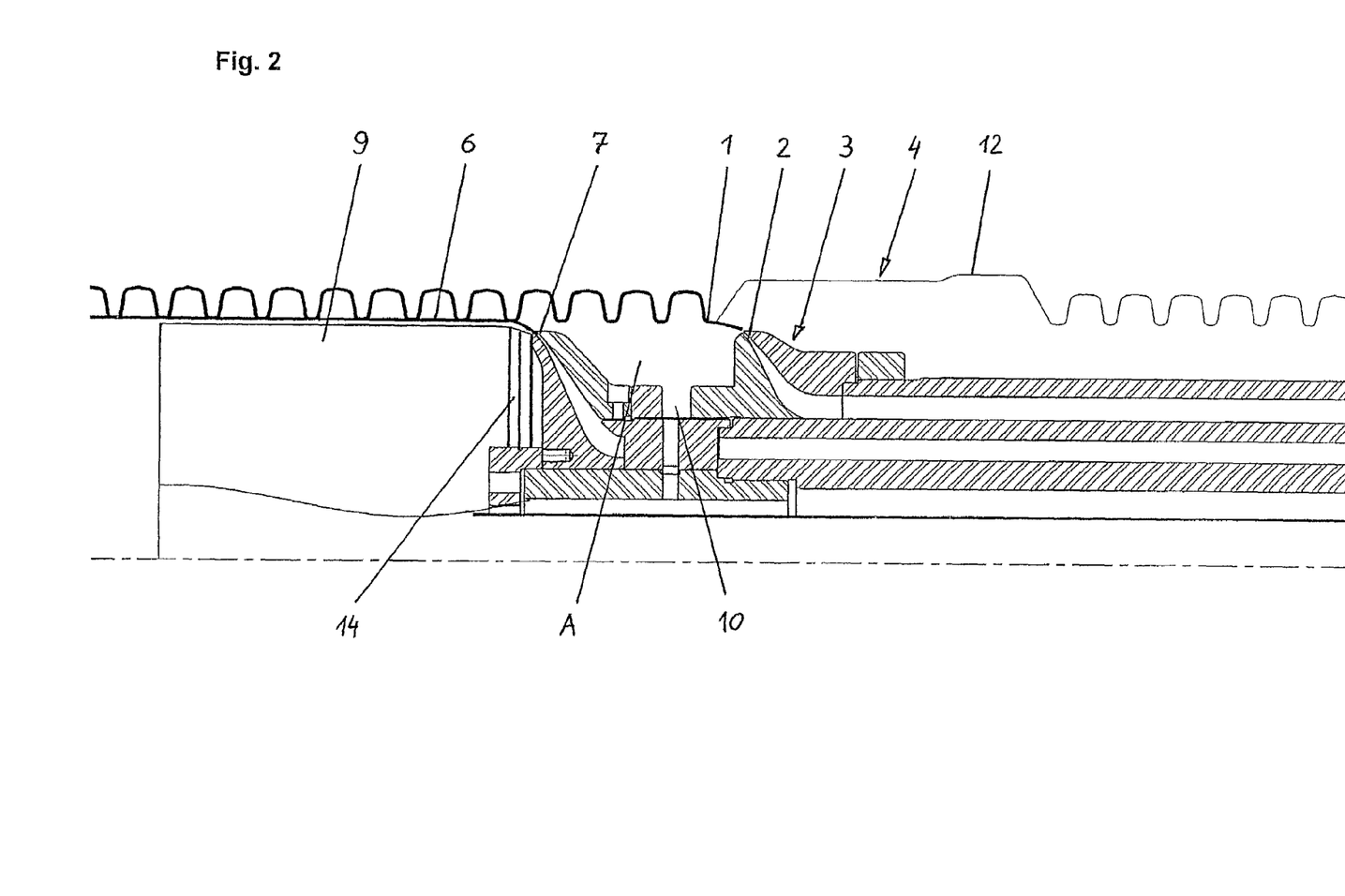
FIG. 2 is a longitudinal section through part of the extrusion head and the mould tunnel at the beginning of the manufacture of a connecting sleeve.

In the process step shown in FIG. 2, first die 2 of extrusion head 3 has reached the beginning of a sleeve recess 12 in mould tunnel 4 that corresponds to the connecting sleeve, while second die 7 is still opposite the section of mould tunnel 4 that forms corrugated mould wall 13. First tube 1 emerging from first die 2 is expanded at the end of sleeve recess 12 lying in the direction of production, in that pressure p1 is switched to an essentially constant pressure p2 less than p1. Pressure p1 in space A between the two tubes 1 and 6 is selected such that, during subsequent shaping to form a connecting sleeve, tube 1 is pressed evenly against sleeve recess 12 and displays a constant wall thickness over the entire connecting sleeve.

Figure 3:
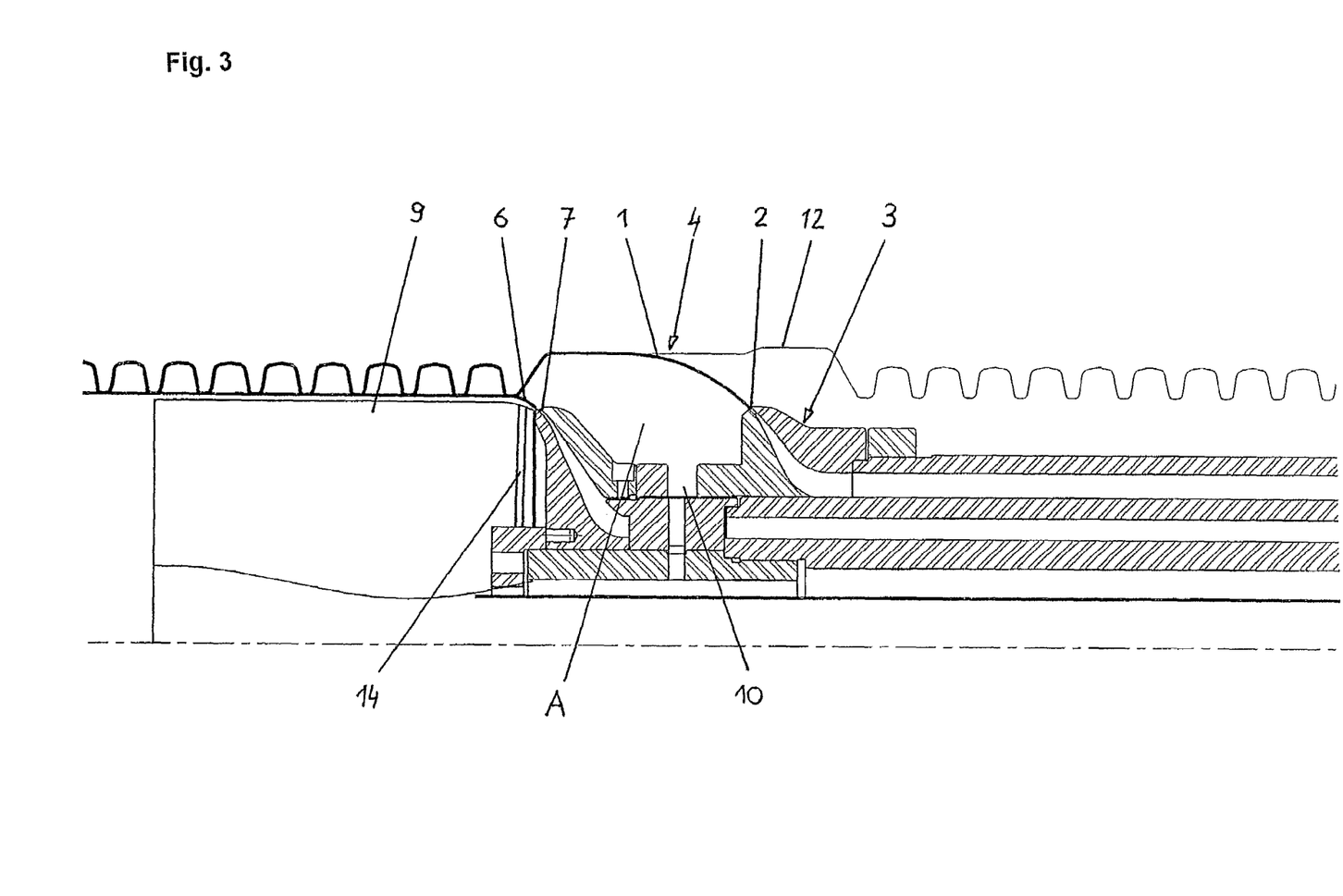
FIG. 3 is a longitudinal section through part of the extrusion head and the mould tunnel during extrusion of the first tube into the sleeve recess of the mould tunnel.

FIG. 3 shows a process situation in which second die 7 of extrusion head 3 has reached the beginning of sleeve recess 12 of mould tunnel 4 in the direction of production, while first tube 1 is still being extruded into sleeve recess 12. Pressure p2 is still being applied in space A between the two tubes 1 and 6. Pressure p2 presses first tube 1 evenly against sleeve recess 12. Air extraction ducts (not shown) provided in the moulds of sleeve recess 12 do not effectively apply a vacuum to the outside of first tube 1 until after tube 1 contacts the sleeve recess. In FIG. 3, this is the front area in the direction of production. In the area in which first tube 1 emerging from first die 2 is expanded towards sleeve recess 12, but has not yet contacted it, no sufficient partial vacuum exists for the shaping of the sleeve of tube 1, because only the air flowing into the region between first tube 1, extrusion head 3 and mould tunnel 4 is extracted through the air extraction ducts. Consequently, the sleeve of tube 1 is effectively shaped with the help of pressure p2 in space A between the two tubes.

As shown in FIG. 3, pressure p2 is set such that first tube 1 extruded through first die 2 is expanded towards sleeve recess 12, but not so much that excessive stretching occurs, which would lead to a smaller wall thickness of tube 1 at the beginning and in the middle of sleeve recess 12 and backing-up of the thermoplastic material, and thus to an increase in the wall thickness at the end of sleeve recess 12 facing away from the direction of production.

In order to effectively fuse second tube 6 to first tube 1, which has been expanded into a connecting sleeve, a pressure p3 above atmospheric pressure is applied via a second gas duct 14 to the inside of second tube 6 in the process situation shown in FIG. 3. In an initial phase, pressure p3 is set such that second tube 6 is expanded slightly into sleeve recess 12 without being overly stretched.

Figure 4:
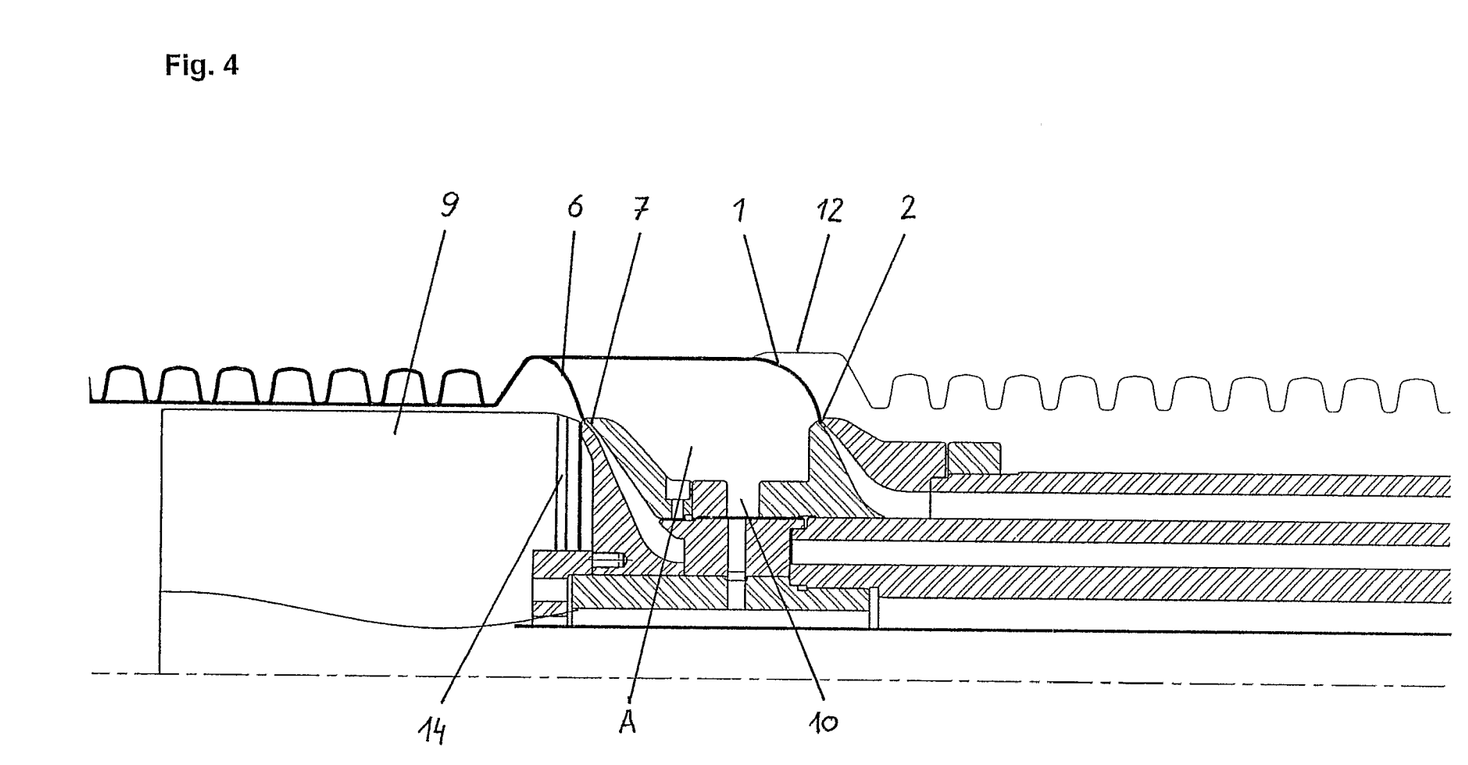
FIG. 4 is a longitudinal section through part of the extrusion head and the mould tunnel during extrusion of the second tube into the first tube, which has been expanded into a connecting sleeve.

During a later phase shown in FIG. 4, in which second tube 6 has expanded to form the connecting sleeve, pressure p3 is increased to ensure optimum fusing of second tube 6 to first tube 1. Pressure p2 in space A between the two tubes 1 and 6 is still held essentially constant. It is important during the phase shown in FIG. 3, in which both tubes 1 and 6 are being moulded into the connecting sleeve, that pressures p2 and p3 be provided with open-loop or closed-loop control such that a specified pressure differential is maintained between p2 and p3. This results in uniformly stable fusing of the two tubes 1 and 6 in the region of the connecting sleeve.

Figure 5:
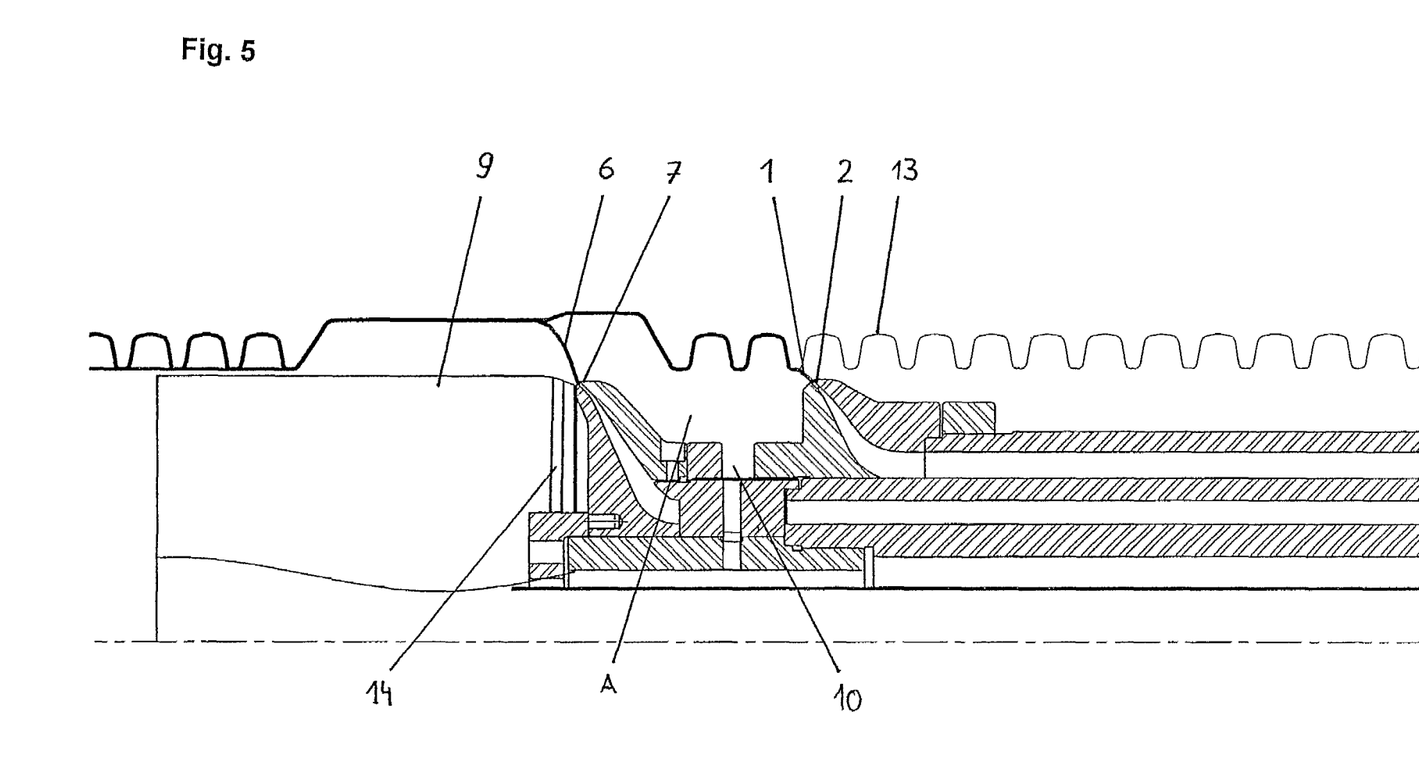
FIG. 5 is a longitudinal section through part of the extrusion head and the mould tunnel during extrusion of the second tube, following formation of the connecting sleeve by the first tube.

FIG. 5 shows a subsequent process situation, where first tube 1 is again being extruded into a section with corrugated mould wall 13, while second tube 6 is still being expanded to form the connecting sleeve. At this point, pressure p2 is still being applied to space A between the two tubes 1 and 6, while second tube 6 is being pressed up against first tube 1 by internal pressure p3.

Figure 6:
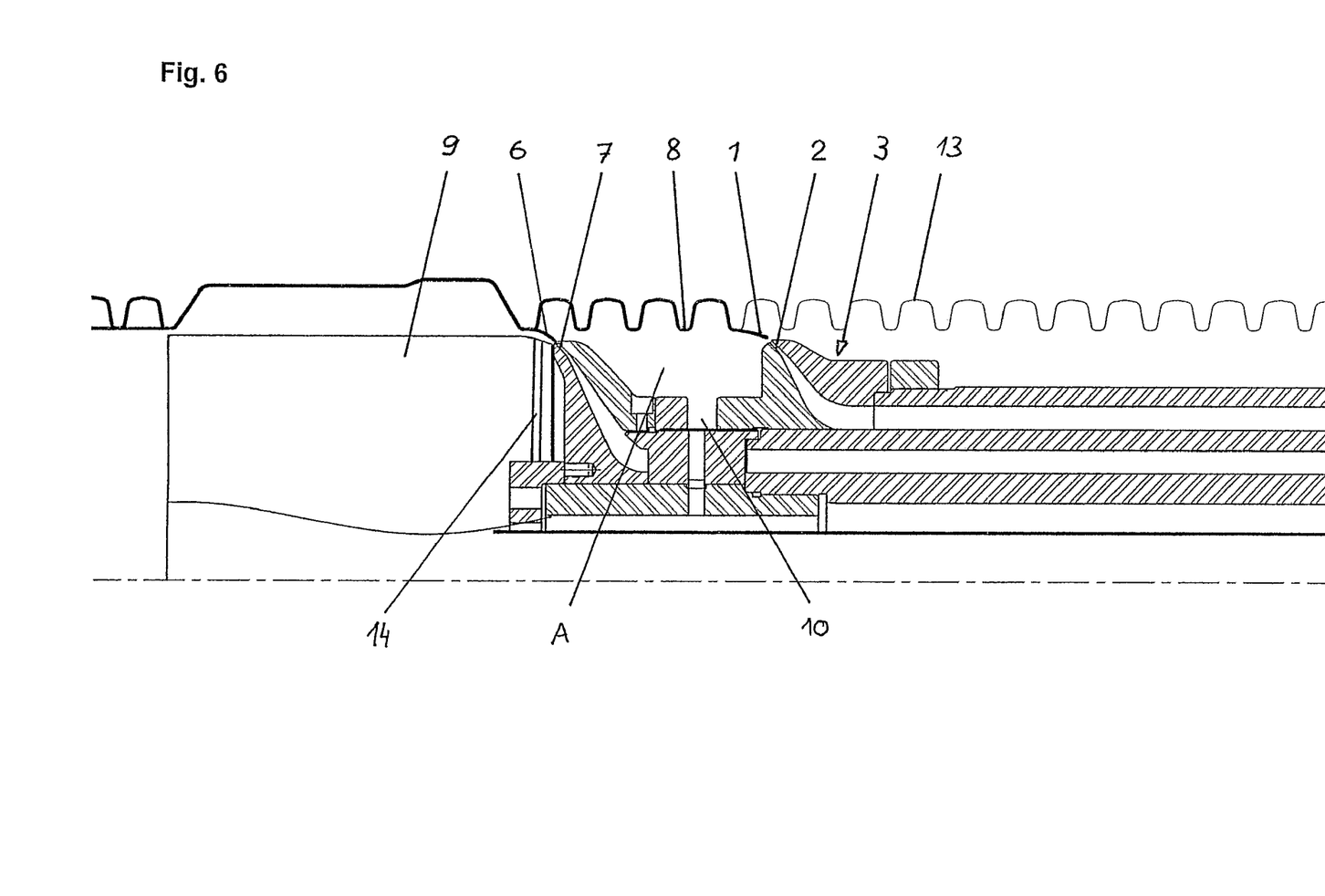
FIG. 6 is a longitudinal section through part of the extrusion head and the mould tunnel after manufacture of the connecting sleeve.

In the situation shown in FIG. 6, the shaping of the connecting sleeve has been concluded by both first tube 1 and second tube 6. Pressure p3 applied to the inside of second tube 6 is switched off and pressure p1 is again applied to space A between the two tubes 1 and 6, in order to ensure that second tube 6 is as smooth as possible and welded to corrugation troughs 8 of first tube 1 after cooling of the thermoplastic material, where second tube 6 is moulded further by calibrating mandrel 9 to form a smooth inside wall. The pressure conditions are maintained until a section such as that shown in FIG. 2 is obtained as the process continues.

During moulding of the first corrugations of tube 1, as shown in FIG. 6, a higher pressure can initially be applied to space A, in order to optimally fill the first corrugation troughs of moulds 5 with thermoplastic material, before continuing the process at a lower pressure p1.

FIG. 7 shows the control of pressures p1, p2 and p3 by compressed gas controllers 15 and 16 connected to a first gas duct 10 and a second gas duct 14 via controller 17 for the timed switching of compressed gas controllers 15 and 16.

Compressed gas for generating pressures p1, p2 and p3 is fed via compressed gas line 18 to compressed gas controllers 15 and 16. Compressed gas controller 15 serves to generate pressure p1 and pressure p2 in space A between the two tubes 1 and 6 with the gas flowing out of the mouth of first gas duct 10, while compressed gas controller 16 is provided to generate pressure p3 applied to the inside of second tube 6 with the compressed gas flowing out of the mouth of second gas duct 14. The timed switching of compressed gas controllers 15 and 16 is carried out by controller 17, as described below.

As indicated by the process steps shown in FIGS. 1 to 6, the timed switching of pressures p1, p2 and p3 depends on the position of sleeve recess 12 of mould tunnel 4 relative to extrusion head 3, particularly to dies 2 and 7. In the simplest version, timed switching can be performed by proximity switches located upstream and downstream of sleeve recess 12. However, if the pressure setting is to be variable over time and made by means of closed-loop control, it is expedient to detect the assumption of a predetermined position of a specific half-mould 5' on its circuit and to control the timed adjustment of pressures p1, p2 and p3 with the help of this detected information.

For this purpose, a mark, e.g. a projection or recess on the outside of the half-mould, can be provided on the outside of half-mould 5', where a stationary sensor 19, in this case a proximity switch, can detect when half-mould 5' reaches the predetermined position. Controller 17 has a program that switches compressed gas controllers 15 and 16 depending on detection of the position by sensor 19.

The program of controller 17 takes into account the given geometry of the paths of half-moulds 5' that form the circuits and, in particular, the position of the half-moulds that form sleeve recess 12. Based on the detection of the specified position of half-mould 5' by controller 17, pressures p1, p2 and p3 can be adjusted in the process situations described above and particularly those shown in FIGS. 2, 3 and 6.

The repeated detection of the specified position of half-mould 5' by sensor 19 serves to reset the controller program.

Furthermore, a pulse generator 20 can be provided that transmits pulses to controller 17, where the succession of two pulses depends on the half-moulds travelling a specific distance. The pulse generator can, for example, generate pulses based on the rotational speed or rotational travel of a toothed wheel, which serves to deflect the circulating row of half-moulds 5, and transmit them to controller 17. With the help of the pulses, the distance of the half-moulds forming sleeve recess 12 from the respective switching position of pressures p1, p2 and p3 on the mould path can be determined and the switching of the pressures carried out as described above. Sensor 19 again serves to initiate detection or reset the procedure.

Variation in the speed of half-moulds 5 on their circulating path can be taken into account with the help of pulse generator 20.

Controller 17 can further have a device for varying the path speed of half-moulds 5 with a program that controls the switching of pressures p1, p2 and p3 automatically, i.e. without detecting machine data that depend on half-moulds 5 travelling a specific distance.

Figure 8:
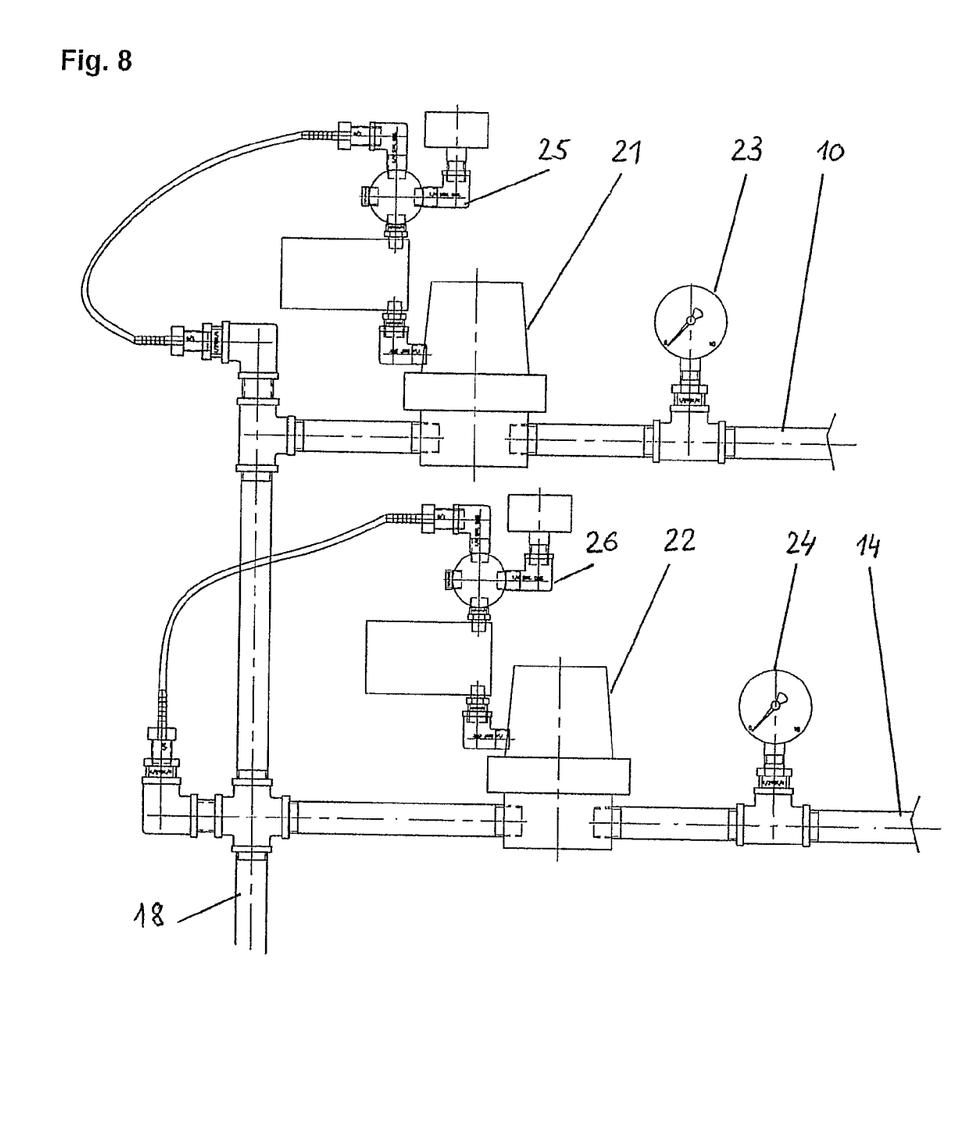
FIG. 8 is a view of the compressed gas controllers.

FIG. 8 shows a practical example of compressed gas controllers 15 and 16 for the timed switching of pressures p1 and p2, and p3. The compressed gas required to set pressures p1, p2 and p3 is fed through compressed gas line 18, which is connected by manifolds to pressure controllers 21 and 22. Downstream of pressure controllers 21 and 22, the gas pressure emerging from them is measured by pressure gauges 23 and 24 and reported to a correcting unit (not shown in FIG. 8) inside pressure controllers 21 and 22. However, since the correcting units, as shown in FIG. 8, are operated at a lower pressure with the help of the compressed gas provided by compressed gas line 18, a pressure reducer 25 or 26 is required, which can be adjusted manually in the practical example shown here.

Furthermore, sensors (not shown in the drawing) can be provided for measuring the temperature of the gas present in space A between the two tubes and/or that of the thermoplastic material of tubes 1 and 6, where the gas pressure required to reach pressures p1 and p2 in space A between the two tubes can be adjusted on the output side of compressed gas controllers 15 and 16 with the help of the temperature values.

Furthermore, controller 17 (not shown in FIG. 8) connected to pressure controllers 21 and 22 can be designed such that a specified pressure differential can be set between p2 and p3 with the help of pressure controllers 21 and 22.

VI. LIST OF REFERENCE NUMBERS

1 First tube
2 First die
3 Extrusion head
4 Mould tunnel
5 Half-mould
5' Half-mould
6 Second tube
7 Second die
8 Corrugation trough
9 Calibrating mandrel
10 First gas duct
11 Intermediate space between the two tubes
12 Sleeve recess
13 Corrugated mould wall
14 Second gas duct
15 Compressed gas controller
16 Compressed gas controller
17 Controller
18 Compressed gas line
19 Sensor
20 Pulse generator
21 Pressure controller
22 Pressure controller
23 Pressure gauge
24 Pressure gauge
25 Pressure reducer
26 Pressure reducer
A Space between the two tubes

We claim:

1. A method for manufacturing a double-walled, thermoplastic tube, where
   a) a first tube (1) is extruded into a mould tunnel (4) having at least one row of moulds (5) guided on a path,
   b) the first tube (1) is given a corrugated shape in at least one first section and expanded into a connecting sleeve in at least one second section,
   c) a second tube (6) is extruded into the first tube and pressed against the corrugation troughs (8) of the first tube (1),
   d) subjecting the space (A) between the two tubes (1, 6) to a first pressure (p1) that is above atmospheric pressure while the first tube (1) is being given the corrugated shape and the second tube (6) is being extruded into the first tube,
   e) subjecting the space (A) between the two tubes (1, 6) to a second pressure (p2) at a specified time proximate each expansion of the first tube (1) into the connecting sleeve including switching the first pressure (p1) to the second pressure (p2) with a compressed gas controller, the second pressure (p2) an essentially constant pressure that is less than or equal to the first pressure (p1) and above atmospheric pressure, or to a variable, but not continuously declining pressure (p2),
   f) subjecting a third pressure (p3) above atmospheric pressure against an interior of the second tube (6) where the second tube (6) is pressed against the first tube (1) during extrusion of the second tube (6) into the first tube (1) to form the connecting sleeve, and
   g) applying the first pressure (p1) to space (A) between the two tubes (1, 6) proximate completion of the connecting sleeve by the second tube (6).

2. The method according to claim 1, wherein the first pressure (p1) is switched to the second pressure (p2) immediately prior to expansion of the first tube (1) into the connecting sleeve.

3. The method according to claim 2, wherein the third pressure (p3) is applied to the inside of the second tube (6) at a predetermined time prior to the extrusion of the second tube (6) into the connecting sleeve.

4. The method according to claim 3, wherein a specified position of a mould (5') on its path is detected and the setting of the first, second, and third pressures (p1, p2) and (p3) is controlled based in part on this detected information.

5. The method according to claim 4, wherein events that make it possible to determine the distance travelled by the moulds (5) on the path are detected and the setting of the first, second, and third pressures (p1, p2 and p3) is controlled based in part on this detected information.

6. The method according to claim 1, wherein the third pressure (p3) is applied to the inside of the second tube (6) at a predetermined time prior to the extrusion of the second tube (6) into the connecting sleeve.

7. The method according to claim 6, wherein a specified position of a mould (5') on its path is detected and the setting of the first, second and third pressures (p1, p2 and p3) is controlled based in part on this detected information.

8. The method according to claim 1, wherein a specified position of a mould (5') on its path is detected and the setting of the first, second, and third pressures (p1, p2 and p3) is controlled based in part on this detected information.

9. A method for manufacturing a double-walled, thermoplastic tube, the method comprising:
   a) extruding a first tube into a mould tunnel comprising at least one row of moulds guided on a path,
   b) forming the first tube into a corrugated shape in at least one first section and expanded into a connecting sleeve in at least one second section,
   c) extruding a second tube into the first tube and pressing the second tube against the corrugation troughs of the first tube,
   d) applying a first pressure that is above atmospheric pressure to the space between the first and second tubes while the first tube is given a corrugated shape and the second tube is extruded into the first tube, e) switching the first pressure to a second pressure with a compressed gas controller to apply the second pressure to the space between the first and second tubes at a specified time proximate to expansion of the first tube into a connecting sleeve, where the second pressure is less than or equal to the first pressure and above atmospheric pressure, f) applying a third pressure above atmospheric pressure to an inside of the second tube during extrusion of the second tube into the first tube during formation of the connecting sleeve to press the second tube against the first tube, and g) applying the first pressure to the space between the first and second tubes after application of the second pressure.

10. The method according to claim 9, wherein the second pressure is a constant pressure.

11. The method according to claim 9, wherein the second pressure is a variable pressure that does not continuously decline.

12. The method according to claim 9, wherein the first pressure is switched to the second pressure immediately prior to expansion of the first tube into a connecting sleeve.

13. The method according to claim 12, wherein applying the third pressure occurs at a predetermined time prior to the extrusion of the second tube into the connecting sleeve and after the first tube is expanded into the connecting sleeve.

14. The method according to claim 13, further comprising
detecting a specified position of at least one marked mould on its path, and
setting the first, second, and third pressures in response to detection of at least one marked mould.

15. The method according to claim 14, further comprising
determining a distance travelled by the moulds on the path based on detection of at least one marked mould, and
setting at least one of the first, second, and third pressures based on the determination of distance.

16. The method according to claim 13, further comprising
determining a distance travelled by the moulds on the path based on detection of at least one marked mould, and
setting at least one of the first, second, and third pressures based on the determination of distance.

17. The method according to claim 9, wherein applying the third pressure occurs at a predetermined time prior to the extrusion of the second tube into the connecting sleeve and after the first tube is expanded into the connecting sleeve.

18. The method according to claim 17, further comprising
detecting a specified position of at least one marked mould on its path, and
setting the first, second, and third pressures in response to detection of at least one marked mould.

19. The method according to claim 9, further comprising
detecting a specified position of at least one marked mould on its path, and
setting the first, second, and third pressures in response to detection of at least one marked mould.

20. A method according to claim 9, wherein the first and second pressures are caused by a flow of gas into the space between the first and second tubes, and
the third pressure is caused by a second flow of gas against the inside of the second tube.

21. A method according to claim 9, wherein applications of the first and second pressures are controlled by the compressed gas controller.

22. A method for manufacturing a double-walled, thermoplastic tube, the method comprising:
extruding a first tube into a mould tunnel having at least one corrugated section and at least one connecting sleeve section,
extruding a second tube into the first tube,
supplying a gas having a first pressure that is above atmospheric pressure through a gas duct to the space between the first and second tubes while the first tube is being extruded into the at least one corrugated section and the second tube is extruded into the first tube,
switching the pressure of the gas being supplied from the gas duct to the space between the first and second tubes from the first pressure to a second pressure at a time proximate to expansion of the first tube into a connecting sleeve with a compressed gas controller, where the second pressure is less than or equal to the first pressure and above atmospheric pressure, and
switching the pressure of the gas being supplied from the gas duct to the space between the first and second tubes to the first pressure with the compressed gas controller after supplying the gas at the second pressure.

23. The method according to claim 22, further comprising supplying another gas at a third pressure through a second gas duct to an inside of the second tube at least during extrusion of the second tube against the first tube in the at least one connecting sleeve section.

* * * * *